United States Patent Office 3,695,838
Patented Oct. 3, 1972

3,695,838

PROCESS FOR RECOVERING MERCURY FROM WASTE WATERS OF INDUSTRIAL PROCESSES

Wilhelm Knepper, Marl, and Severin Austin, Sythen, Germany, assignors to Chemische Werke Huels, Aktiengesellschaft, Marl, Germany No Drawing. Filed Oct. 30, 1970, Ser. No. 85,775
Claims priority, application Germany, Oct. 31, 1969, P 19 54 828.8
Int. Cl. C22b *43/00*
U.S. Cl. 425—106 6 Claims

ABSTRACT OF THE DISCLOSURE

Mercury present in waste waters from industrial processes, such as the electrolysis of alkaline-chlorides using the amalgam method, is recovered to prevent losses thereof and to prevent ecological contamination of waterways. Recovery is accomplished by converting the mercury to low-water-solubility compounds and/or to metallic mercury by the use of precipitants and subsequent separation thereof from the waste water.

BACKGROUND OF THE INVENTION

This invention relates to the recovery and prevention of losses of mercury present in the waste waters of industrial processes. The high price of mercury requires the prevention of its losses in waste waters which are usually disposed of into waterways. More importantly, the contamination of waterways with mercury can raise serious ecological problems and it is desirable that waste waters to be disposed of into waterways be substantially free of mercury.

An example of an industrial process which produces waste water containing mercury is the electrolysis of alkaline-chlorides using the amalgam method. Considerable losses of mercury occur in that process and investigations during the development of this invention have shown that the predominant portion of the mercury being lost is discharged with the waste water from the electrolysis plants; and in comparison thereto, other sources of loss are practically insignificant.

OBJECTS OF THE INVENTION

It is an object of the invention to provide a process for recovering and preventing losses of mercury present in waste waters of industrial processes. Another object of the invention is to provide a process for the prevention of the mercury contamination of waterways in the disposing of waste waters from industrial processes. Other objects will be apparent to those skilled in the art to which this invention pertains.

SUMMARY OF THE INVENTION

According to this invention, waste water containing mercury is treated with a suitable precipitant to convert the mercury to low-water solubility compounds and/or to metallic mercury which can readily be removed from the waste water by separation procedures such as filtraton. The mercury is preferably converted to mercuric sulfide by precipitation with the preferred compound hydrogen sulfide or other compounds which yield sulfide ions. The mercury can also be converted to metallic mercury by reduction with reducing agents such as non-noble metals and low-molecular aldehydes. The precipitant is used in chemical equivalent amounts directly proportional to the dissolved mercury content of the waste water, and it is advisable to add an excess amount of precipitant up to $10^4$-molar and preferably up to 100-molar. After addition of the precipitant, a holding period of at least 5 seconds, preferably 15–500 seconds, and especially 30–120 seconds is required to permit the precipitation to take place before separation of the formed low-water solubility mercury compounds and/or metallic mercury. Conventional means such as settling tanks, filters, and the like can be used for separating the precipitated mercury compounds and/or metallic mercury from the waste water.

DETAILED DISCUSSION

The invention will be described with reference to the alkaline-chloride electrolysis according to the amalgam method. The waste water from that method is obtained mostly from the purification of the mercury which must necessarily be conducted from time to time by rinsing the mercury with water in the electrolysis cells not in operation. A further portion of the waste water is obtained from other purification and cleaning operations in the electrolysis plants.

Investigations disclosed that the mercury can be present in the waste water in various forms. Thus, it can be present in dissolved form as a salt, emulsified in the form of extremely tiny mercury droplets, or deposited on the solid components present in the waste water. Moreover, differences can also occur depending upon the waste water being neutral, alkaline, or acidic.

The problem on which this invention is based is solved by chemically converting the mercury dissolved in the plant waste waters into a mercury compound having low solubility properties in water and mechanically separating from the waste water the converted mercury compound together with undissolved metallic mercury and insoluble mercury compounds already present in the waste water. In this manner, it is possible to remove mercury contaminants almost completely from the waste water in one process step.

The solubility of the converted mercury compound must be lower than about 1 mg./l., and preferably lower than about 0.1 mg./l. The dissolved mercury compound is preferably precipitated as the mercuric sulfide, which has the requisite low solubility properties as set forth above. The dissolved mercury compound can also be precipitated as the mercury selenide, mercury telluride, or as any other mercury compound having the requisite low solubility properties. The dissolved mercury compound can also be reduced to metallic mercury by the use of a great variety of suitable reducing agents such as non-noble metals and low-molecular aldehydes. Metallic mercury can likewise be separated without difficulties from the waste water.

The dissolved mercury compound can be precipitated as the mercuric sulfide by the use of hydrogen sulfide or other compounds yielding sulfide ions, for example, thioacetamide, thiourea, and the like. Generally, sulfides having a higher solubility in water than mercuric sulfide are suitable, however, the use of hydrogen sulfide is preferred. The hydrogen sulfide can be used in pure gaseous form, diluted by other gases, or dissolved in an aqueous solution. In addition, other precipitants can be used, for example, alkali sulfides, alkali selenides, alkali tellurides, and ammonium sulfide.

As reducing agents non-noble metals such as zinc, aluminum, and preferably iron can be used. A preferred aldehyde is formaldehyde.

In the precipitation of mercurous ions, bromides, iodides, chlorides, such as HCl, HBr, HI, and the like can be used.

The amount of precipitant to be used is directly proportional to the dissolved mercury content in the waste water on an equivalence basis. Generally, it is advisable to add an excess amount of precipitant, and the excess amount can be up to $10^4$-molar, and preferably up to 100-molar of precipitant, based on the total dissolved mercury content of the waste water. It was found that when the preferred precipitant, gaseous hydrogen sulfide, was used in waste waters having a total dissolved mercury content of 2–100 mg. Hg/l., amounts of 0.2–100, preferably 1–30, and especially 5–12 normal liters of gaseous hydrogen sulfide per cubic meter of waste water were suitable. It is possible to add larger amounts of gaseous hydrogen sulfide, however, further improvements are not obtained. In adding the hydrogen sulfide to the waste water, as a gaseous mixture or in aqueous solution, the solution or mixture must contain the amount of hydrogen sulfide required for each cubic meter of waste water.

After the precipitant is added to the waste water, a period of time is required before the separation step of the low-solubility mercury compounds to permit the precipitation and formation of the compounds to take place. In the case of precipitation with hydrogen sulfide, the period of time is at least 5 seconds, preferably 15–500 seconds, and especially 30–120 seconds.

In the separation step of the low-water-solubility mercury compounds and the metallic mercury, any conventional separating devices can be employed, for example, sufficiently large settling tanks, filters, centrifuges, or hydrocyclones. In the separation step, a practically mercury-free waste water and a mercury-enriched sludge are obtained. The latter can be processed to yield mercury in a known conventional manner.

The processing of waste waters, in accordance with this invention, can be conducted in a continuous manner or discontinuously. Usually, the waste waters are collected in large tanks before disposal. Accordingly, at intervals a continuous stream of waste water can be withdrawn from the tanks, and into this stream, the precipitant can be introduced continuously by conventional means to suitably effect a thorough intermixing thereof in the stated proportions. Similarly, the point of introduction of the precipitant into the stream and the point at which the stream enters the separation device to remove the precipitate, can be designed to permit a suitable average residence time for the precipitant in the stream to allow for the period of time described above required for the precipitation to take place.

The process of this invention can be conducted with neutral, as well as acidic, or alkaline waste waters. In this regard, a varying solids content of the waste waters is without influence, for example, in case of alkaline, lime-containing water, larger amounts of solids are produced. Of course, attention must be directed to the fact that the devices employed are resistant against the media utilized in each particular case.

The excess hydrogen sulfide present in the mercury-free waste water is harmless, since the concentration thereof is low, and is readily oxidized by atmospheric oxygen.

Without further elaboration, it is believed that one skilled in the art can, using the preceding description, utilize the present invention to its fullest extent. The following preferred specific embodiment is, therefore, to be construed as merely illustrative, and not limitative of the remainder of the disclosure in any way whatsoever.

EXAMPLE

Waste water from a sodium chloride electrolysis is collected in a container having a capacity of 150 m.$^3$. From the bottom of the container, a centrifuge is fed with 12 m.$^3$ of waste water per hour via a connecting pipeline. Between the container and the centrifuge, a feed point for hydrogen sulfide as well as a mixing mechanism are installed in the connecting conduit. The hydrogen sulfide as well as a mixing mechanism are installed in the connecting conduit. The hydrogen sulfide is fed at a rate of 100 l./h. The volume of the connecting conduit between the point where the hydrogen sulfide is added and the centrifuge is dimensioned so that there is a residence time of the precipitant of at least one minute. To provide the residence time the volume of the conduit is somewhat more than 200 liters.

The plant waste water to be treated contains greatly varying amounts of mercury of between about 5 and 100 mg./l. The waste water exiting from the centrifuge always contains less than 0.2 mg. of Hg/l. The detection of mercury in the waste water was conducted colorimetrically with dithiozone [diphenylthiocarbazone].

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for recovering mercury and reducing losses thereof in waste waters of industrial processes containing 2–100 mg. Hg/l. of dissolved mercury per cubic meter, comprising converting the dissolved mercury compounds in said waste water to mercury sulfide, employing a large chemical equivalent excess, between 0.2–100 normal liters per cubic meter of waste water, of hydrogen sulfide and separating from said waste water by mechanical means only the thus-precipitated mercury sulfide.

2. A process for recovering mercury and reducing losses thereof in waste wash waters from alkaline-chloride electrolysis by the amalgam method and containing 2–100 mg. Hg/l. of dissolved mercury per cubic meter, comprising converting disolved mercury compounds in said waste water to mercury sulfide, employing a large chemical equivalent excess, between 0.2–100 normal liters per cubic meter of waste water, of hydrogen sulfide and separating from said waste water by mechanical means only the thus-precipitated mercury sulfide.

3. The process of claim 2 wherein 1–30 normal liters of hydrogen sulfide per cubic meter of waste water is added thereto.

4. The process of claim 3 wherein 5–12 normal liters per cubic meter of waste water of gaseous hydrogen sulfide are continuously added to a stream of waste water from a sodium chloride electrolysis.

5. The process of claim 3 wherein said hydrogen sulfide is added as a gas.

6. The process of claim 3 wherein said hydrogen sulfide is added in aqueous solution.

References Cited

UNITED STATES PATENTS

| | | | |
|---|---|---|---|
| 3,039,865 | 6/1962 | Gilbert et al. | 75—109 X |
| 2,860,952 | 11/1958 | Bergeron et al. | 23—134 |
| 3,476,552 | 11/1969 | Parks et al. | 75—121 X |
| 3,369,886 | 2/1968 | Metzger et al. | 75—109 X |

GEORGE T. OZAKI, Primary Examiner

U.S. Cl. X.R.

75—108, 109, 121